United States Patent [19]

Epstein et al.

[11] 4,309,257
[45] Jan. 5, 1982

[54] NOVEL PROCESS FOR THE PRODUCTION OF OPTICALLY SELECTIVE SURFACES

[75] Inventors: Michael Epstein, Holon; Israel Dostrovsky, Rehovot, both of Israel

[73] Assignee: Yeda Research & Development Company Ltd., Rehovot, Israel

[21] Appl. No.: 183,987

[22] Filed: Sep. 4, 1980

[30] Foreign Application Priority Data

Sep. 10, 1979 [IL] Israel ................................ 58214

[51] Int. Cl.³ ............................................. C25D 11/34
[52] U.S. Cl. ........................................................ 204/56 R
[58] Field of Search ....................................... 204/56 R

[56] References Cited

U.S. PATENT DOCUMENTS

| 2,315,518 | 4/1943 | Gwynn | 204/56 R |
| 3,114,683 | 12/1963 | Chorney | 204/56 R |
| 3,198,672 | 8/1965 | De Hart | 204/56 R |

OTHER PUBLICATIONS

"Black Anodizing Cu & Brass", by McLean et al., Metal Finishing, Jun. 1945, pp. 247-248.

*Primary Examiner*—R. L. Andrews
*Attorney, Agent, or Firm*—Browdy and Neimark

[57] ABSTRACT

The invention relates to a process for the production of optically selective surfaces for use in solar collectors, having a predetermined ratio of absorbance $a_s$ to emmitance $\epsilon$ of at least 10, which comprises effecting an anodic oxidation of copper, or copper applied to any substrate metal, in an alkaline bath at an elevated temperature between 50° and 85° C., preferably 70° to 85° C., and at a current density of above 1 mA/cm² and up to 40 mA/cm² until an increase of resistance is experienced. Substrate metals may be copper, copper plated steel, copper plated galvanized iron, copper plated nickel, nickel plated steel to which a layer of copper is applied, and the like.

3 Claims, No Drawings

NOVEL PROCESS FOR THE PRODUCTION OF OPTICALLY SELECTIVE SURFACES

FIELD OF THE INVENTION

The invention relates to a novel process for the production of optically selective surfaces of the type used in solar collectors and for similar purposes. The efficiency of such collectors depends to a large extent on the properties of the surface of the collector. The selectivity of radiation absorption is of special importance for devices operating at medium to high working temperatures. The main parameters are absorption and emission at certain wavelengths. By resorting to specific surfaces the absolute value of such parameters and their ratio can be varied within a wide range. Surfaces of choice have a poor reflection for incoming sunlight (at the shorter wavelengths) and which have a high absorbance factor $\alpha_s$, whereas for thermal radiation (at a wavelength above about $2\mu$) they are good reflectors and thus poor emitters, having a low infrared emission factor $\epsilon$. The invention provides a process for the production of selective surfaces having desired properties and to devices wherein metal with such surfaces is used, mainly as solar collectors.

STATE OF THE PRIOR ART

There are known many processes for the production of selective surfaces used in solar collectors and in similar devices. One of the best surfaces used hitherto is black nickel, which has a high ratio of solar absorbance to infrared emittance. Such surfaces are nickel black on nickel, chrome black on nickel or on steel. Other surfaces which have advantageous selective properties are produced by the chemical oxidation of copper.

SUMMARY OF THE INVENTION

The present invention relates to a novel process for the production of selective surfaces for use in solar collectors and for use in other devices where similar optical properties are required; to such surfaces and to devices wherein such surfaces are employed. More specifically the invention relates to a process for the production of selective surfaces for use in solar collectors and to collectors provided with such surfaces. According to the invention there is provided a process for the production of such selective surfaces which is based on the controlled anodic oxidation of certain metal surfaces. Preferred embodiments of the invention comprise a process for the selective anodic oxidation of copper plated steel, of copper plated galvanized iron, copper plated nickel, and of certain copper alloys. The process of the invention makes it possible to produce such selective surfaces having a high ratio of $\alpha_s/\epsilon$, which is advantageously of at least 10, and which can attain values as high as about 15. The preferred surfaces are copper or copper plated metals. The surfaces obtained by the process have a high resistance to weathering, they withstand prolonged exposure to sunlight and the advantageous optical properties do not deteriorate during repeated cycles of cooling and heating up to about 180° C.

According to one embodiment of the present invention a metal sheet provided with a copper surface is subjected to anodic oxidation in an alkaline electrolyte in a sequence of steps, each of which is effected at a higher voltage and current density than the preceding one, until the desired properties are attained. This stepwise increase results in surfaces having the desired optical properties. According to a modification of the process the voltage and current density can be varied in a gradual and predetermined manner.

According to another embodiment of the process the metal surfaces are subjected to anodic oxidation in an alkaline electrolyte at a predetermined constant current rate until a certain degree of passivation is attained, the end of the oxidation being indicated by a pronounced increase of resistance of the system: the resistance of the solution increases substantially and if a constant voltage is maintained, the current density falls off in a drastic manner. At this stage oxidation ceases and evolution of oxygen and hydrogen starts instead. It has been established that there exists a certain correlation between the conditions of the process, and more specifically between the conditions of operation of the process and the quantity of electricity passed in order to attain the desired optical properties. The selective surfaces thus produced comprise a novel composition of copper and oxygen in a non-stoichiometric ratio and the oxide film seems to have a definite orientation. The ratio of $\alpha_s/\epsilon$ varies generally between about 12 and 15.

The controlled anodic oxidation of copper or copper-coated metals can be carried out only within a narrow and specific range of process parameters. The temperature must be in the range of from 50° to 85° C., the preferred range, depending also on the concentration of the hydroxide solution, being about 70° to 85° C. The concentration of the alkaline solution must be in the range of from about 0.35 N NaOH to about 1.5 N. The current density must be in the range of from 1 mA/cm$^2$ to 40 mA/cm$^2$, the preferred range being 1.5 mA/cm$^2$ to about 15 mA/cm$^2$ when a constant current density is used. In this narrow range of parameters, a satisfactory surface layer is obtained, whereas outside this narrow and specific range the results are not acceptable.

The above relations can be exemplified as follows: when the oxidation is carried out at a temperature of 75° C. in a 0.75 N solution of NaOH, for a value of $\alpha_s = 93\%$ and for $\epsilon = 9\%$ a current density of 4 mA/cm$^2$ and the quantity of electricity required per cm$^2$ was about 44 Coulombs. When a current density of only 2 mA/cm$^2$ is used the duration required is longer and amount of charge passed to passivation is greater and when higher values of current density (up to about 10 mA/cm$^2$) are used, the process can be completed in a shorter period of time and the amount of charge passed to passivation is smaller.

In the constant current process best values of $\alpha_s/\epsilon$ were attained at elevated temperatures, of from about 50° C. to about 85° C. at a bath concentration of from about 0.35 N NaOH to about 1.5 N NaOH, and at current densities of from 1 mA/cm$^2$ to about 20 mA/cm$^2$. The higher current densities are effectively used at the higher concentrations of sodium hydroxide and at temperatures of about 70° to 85° C. At a concentration of about 0.75 N NaOH best results were obtained at 50° to 85° C. and at current densities of about 1.2 mA/cm$^2$ to about 5 mA/cm$^2$. At 0.35 N NaOH best results were obtained at 70° and 85° C. at current densities of about 1 mA/cm$^2$ to 2 mA/cm$^2$.

When the process is effected with stepwise increases of current density, it is advantageous to start at about 3 mA/cm$^2$ and to increase the current density to about 40 mA/cm$^2$ in from 3 to 8 steps at time intervals of the order of 5 to 15 seconds per step.

The invention is illustrated with reference to the following Examples which are to be construed in a non-limitative manner.

EXAMPLE 1

A cold rolled copper sheet was electroplated with 1$\mu$ of copper in an acid electrolytic bath, rinsed with water and distilled water and treated as follows: the sheet of 50×50 mm was immersed in a bath of 0.75 N NaOH at 75° C. and a direct constant current of 4 mA/cm$^2$ was passed during 120 seconds until passivation was observed. The resulting sheet had a solar absorbance of 93% and an emittance of 9%.

EXAMPLE 2

A steel sheet was electroplated with copper according to conventional procedures; first a preliminary coating was applied to the surface cleaned in an electrolytic alkaline process by electroplating in a cyanide bath and by a further plating in an acid bath until a layer of 15$\mu$ copper was attained. The sheet of 50×50 mm was immersed in 1.5 N NaOH at 80° C. and a direct constant current of 12 mA/cm$^2$ was passed during 100 seconds until passivation was observed. The solar absorbance was 94% and the emittance was 14%.

EXAMPLE 3

A copper plated nickel sheet was immersed in a 0.75 N NaOH bath at 75° C. and the sheet was subjected to a treatment at a current density of 5 mA/cm$^2$ during 10 seconds, and the current density was increased in 5 steps to 12, 19, 26, 33 and 40 mA/cm$^2$ at time intervals of 10 seconds at each current density. The properties were as follows: solar absorbance, 91%; emittance, 10%.

EXAMPLE 4

A copper sheet 50×50 mm was treated in a 0.35 N NaOH solution at 85° C. and a direct constant current of 1.6 mA/cm$^2$ was passed until a substantial increase of voltage was observed (passivation point). The sheet was removed from the alkali solution and washed. It had a solar absorbance of 85% and an emittance of 6.5%.

We claim:

1. A process for the production of optically selective surfaces for use in solar collectors, having a ratio of absorbance $\alpha_s$ to emittance $\epsilon$ of at least 10, which comprises effecting an anodic oxidation of copper, or of copper applied to any metal substrate in alkaline, sodium hydroxide bath of from 0.35 N to 1.5 N sodium hydroxide, at a temperature between 50° C. and 85° C. and at a current density of from 1 mA/cm$^2$ to 40 mA/cm$^2$ until a increase of resistance is experienced.

2. A process according to claim 1, wherein the oxidation is carried out at a temperature between 70° C. and 85° C., in a bath of sodium hydroxide of from 0.75 N to 1.5 N and at a current density from 4 mA/cm$^2$ to 20 mA/cm$^2$.

3. A process according to claim 1, wherein the oxidation is carried out while the current density is increased stepwise or gradually.

* * * * *